(12) United States Patent
Zhang et al.

(10) Patent No.: US 9,263,979 B2
(45) Date of Patent: Feb. 16, 2016

(54) METHOD FOR SMOOTH MOTOR STARTUP

(75) Inventors: Da Zhang, Manchester, CT (US);
Thomas Gietzold, Wethersfield, CT (US); Subbarao Varigonda, Manchester, CT (US); Salih Baris Ozturk, Manchester, CT (US)

(73) Assignee: CARRIER CORPORATION, Farmington, CT (US)

( * ) Notice: Subject to any disclaimer, the term of this patent is extended or adjusted under 35 U.S.C. 154(b) by 20 days.

(21) Appl. No.: 14/163,462

(22) PCT Filed: Jul. 26, 2012

(86) PCT No.: PCT/US2012/048284
§ 371 (c)(1),
(2), (4) Date: Jan. 24, 2014

(87) PCT Pub. No.: WO2013/016505
PCT Pub. Date: Jan. 31, 2013

(65) Prior Publication Data
US 2014/0152212 A1 Jun. 5, 2014

Related U.S. Application Data

(60) Provisional application No. 61/512,224, filed on Jul. 27, 2011.

(51) Int. Cl.
*H02P 6/04* (2006.01)
*H02P 6/20* (2006.01)
*H02P 1/46* (2006.01)
*H02P 21/00* (2006.01)
*H02P 21/14* (2006.01)

(52) U.S. Cl.
CPC *H02P 6/205* (2013.01); *H02P 1/46* (2013.01); *H02P 21/0032* (2013.01); *H02P 21/0042* (2013.01); *H02P 21/0053* (2013.01); *H02P 21/146* (2013.01)

(58) Field of Classification Search
CPC ..... H02P 2203/05; H02P 6/20; H02P 21/146; H02P 6/001; H02P 6/181; H02P 21/0032; H02P 21/0046; H02P 21/0053; H02P 2203/11; H02P 2207/05; H02P 23/14; H02P 6/06; H02P 6/085; H02P 6/18
USPC ............. 318/400.06, 400.04, 400.11, 400.13, 318/716, 799, 272
See application file for complete search history.

(56) References Cited

U.S. PATENT DOCUMENTS 3,601,678 A * 8/1971 Abraham et al. ............. 318/685
4,455,513 A * 6/1984 Fulton et al. ............. 318/400.11
(Continued)

OTHER PUBLICATIONS

International Search Report issued in PCT/US2012/048284 on Jun. 14, 2013, 3 pages.
(Continued)

*Primary Examiner* — Paul Ip
(74) *Attorney, Agent, or Firm* — Cantor Colburn LLP

(57) ABSTRACT

A method of conducting smooth motor startup is provided and includes operating a motor in an open loop control scheme at startup, operating the motor in a closed loop sensorless control scheme at a time after startup and transitioning between the open loop control scheme and the closed loop control scheme by reducing a difference between an estimated rotor angle of the motor and a commanded ramping angle of the motor.

20 Claims, 3 Drawing Sheets

(56) References Cited

U.S. PATENT DOCUMENTS

| | | | |
|---|---|---|---|
| 4,538,422 A | 9/1985 | Mount et al. | |
| 4,549,404 A | 10/1985 | Lord | |
| 4,642,543 A * | 2/1987 | MacMinn | 318/696 |
| 4,673,849 A * | 6/1987 | Sears et al. | 318/272 |
| 4,743,815 A * | 5/1988 | Gee et al. | 318/400.11 |
| 4,912,378 A * | 3/1990 | Vukosavic | 318/400.04 |
| 5,223,772 A * | 6/1993 | Carobolante | 318/400.13 |
| 6,894,450 B2 | 5/2005 | Cheng et al. | |
| 7,066,034 B2 * | 6/2006 | Ying Yin Ho | 73/862.193 |
| 7,221,152 B2 * | 5/2007 | Piippo | 324/207.25 |
| 7,638,959 B2 * | 12/2009 | Rozman et al. | 318/400.09 |
| 7,679,307 B2 | 3/2010 | Mills, Jr. et al. | |
| 8,264,192 B2 * | 9/2012 | Green et al. | 318/799 |
| 8,547,051 B2 * | 10/2013 | Green et al. | 318/799 |
| 2003/0214266 A1 * | 11/2003 | Cheng et al. | 318/716 |
| 2004/0249596 A1 * | 12/2004 | Ho | 702/106 |
| 2005/0052177 A1 * | 3/2005 | Piippo | 324/174 |
| 2005/0264366 A1 * | 12/2005 | Zivanovic et al. | 331/16 |
| 2008/0278101 A1 * | 11/2008 | Shahi et al. | 318/400.11 |
| 2009/0153083 A1 * | 6/2009 | Rozman et al. | 318/400.06 |
| 2010/0083692 A1 | 4/2010 | Todd et al. | |
| 2010/0083693 A1 | 4/2010 | Todd et al. | |
| 2010/0095691 A1 | 4/2010 | Kondou et al. | |
| 2010/0236264 A1 | 9/2010 | Lifson et al. | |
| 2011/0016893 A1 | 1/2011 | Dawes | |
| 2011/0030398 A1 | 2/2011 | Marcinkiewicz et al. | |
| 2011/0030419 A1 | 2/2011 | Kikuchi et al. | |
| 2011/0031914 A1 * | 2/2011 | Green et al. | 318/400.11 |
| 2012/0306414 A1 * | 12/2012 | Green et al. | 318/400.11 |

OTHER PUBLICATIONS

Written Opinion issued in PCT/US2012/048284 mailed Jun. 14, 2013, 6 pages.

Gao et al., A Novel Drive Strategy ffor PMSM Compressor, Electrical and Control Engineering (ICECE), 2010 International Conference, IEEE, Piscataway, NJ, Jun. 25, 2010, pp. 3192-3195.

Balazovic et al., Sensorless PMSM Control for H-Axis Washing Machine Drive; Powere Electronics Specialists Conference 2008, PESC 2008, IEEE Piscataway, NJ, Jun. 15, 2008, pp. 4237-4242.

* cited by examiner

METHOD FOR SMOOTH MOTOR STARTUP

CROSS REFERENCE TO RELATED APPLICATION

This application is a National Stage Application of PCT/US2012/048284 filed Jul. 26, 2012, which claims priority to U.S. Provisional Application No. 61/512,224 filed Jul. 27, 2011, the disclosures of which are incorporated by reference herein in their entireties.

BACKGROUND OF THE INVENTION

Variable speed technology using permanent magnet synchronous motors (PMSMs) for compressors is one of the emerging technologies to lead efficiency improvements in today's Heating, Ventilating and Air Conditioning (HVAC) systems. Different from induction motors, PMSMs need to know rotor position to be able to control the rotor. Since the motor is normally disposed inside the compressor without any speed sensor, rotor angle and speed estimation is needed to control the PMSM compressors. Most rotor angle and speed estimation techniques operate at relatively low efficiencies at low speeds due to noise and low currents, however, and the general approach in these cases is therefore to start the compressor in an open loop control scheme and then switch to a sensorless vector control scheme.

With this approach, the switch transition may at times cause high spike currents, oscillations and stability issues that tend to reduce the product's lifetime and may increase failure rates. Also, the PMSM compressor has to release its pressure difference, which means the compressor may not be able to immediately restart leading to energy stored in the compressor potentially being lost.

BRIEF DESCRIPTION OF THE INVENTION

A method of conducting smooth motor startup is provided and includes operating a motor in an open loop control scheme at startup, operating the motor in a closed loop sensorless control scheme at a time after startup and transitioning between the open loop control scheme and the closed loop control scheme by reducing a difference between an estimated rotor angle of the motor and a commanded ramping angle of the motor.

A method of operating a permanent magnet synchronous motor (PMSM) compressor for smooth motor startup is provided and includes operating the PMSM in an open loop control scheme at startup, operating the PMSM in a closed loop sensorless control scheme at a time after startup and transitioning between the open loop control scheme and the closed loop control scheme by determining a difference between an estimated rotor angle and a commanded ramping angle and controlling the commanded ramping angle to reduce the difference.

A method of operating a permanent magnet synchronous motor (PMSM) compressor for smooth motor startup is provided and includes operating the PMSM in an open loop control scheme at startup with a predefined load condition, operating the PMSM in a closed loop sensorless control scheme at a time after startup and transitioning between the open loop control scheme and the closed loop control scheme by determining a difference between an estimated rotor angle and a commanded ramping angle and controlling the commanded ramping angle to reduce the difference to zero.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
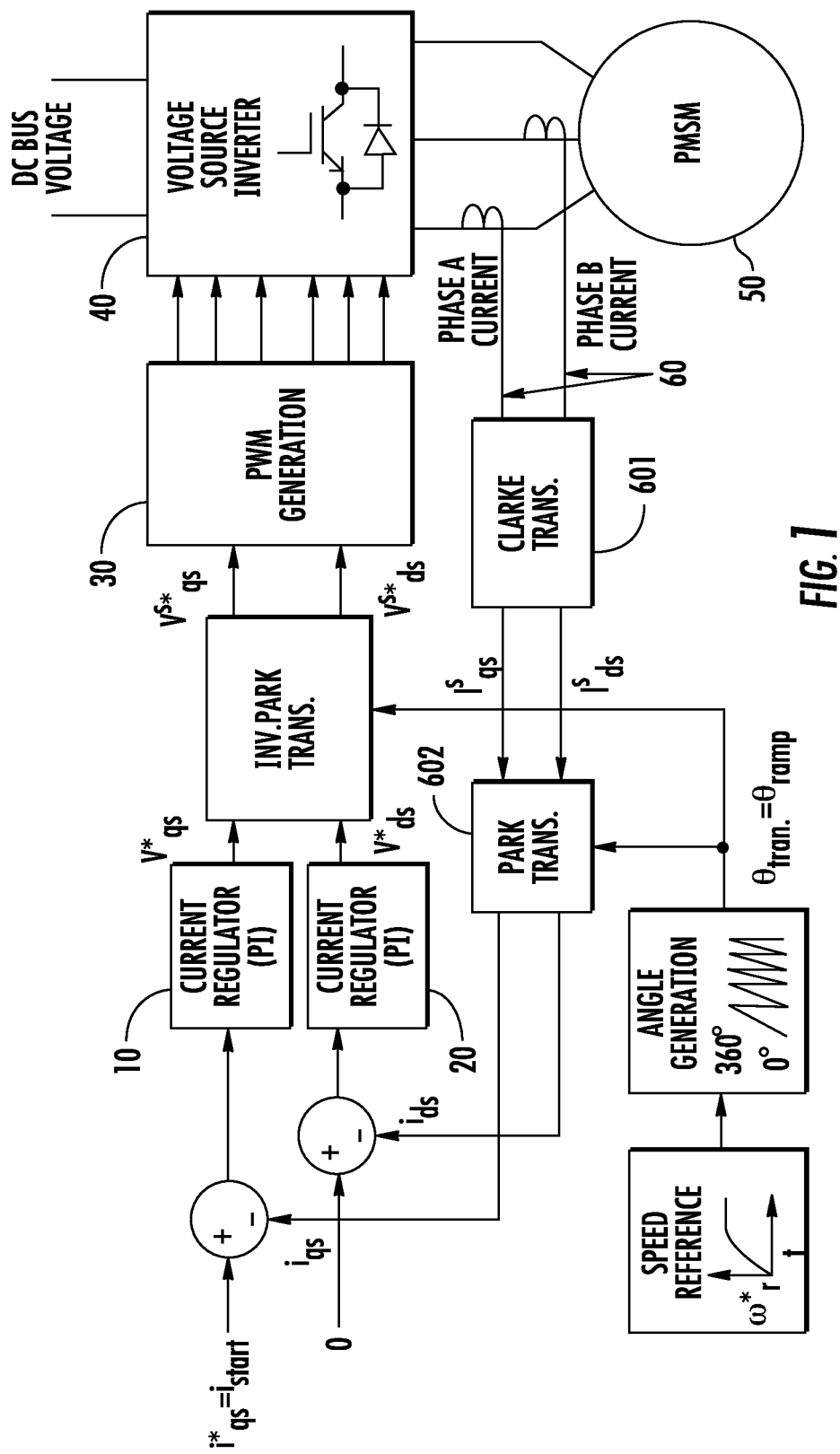
FIG. 1 is a schematic illustration of an open loop (speed) ramp start control scheme.
Figure 2:
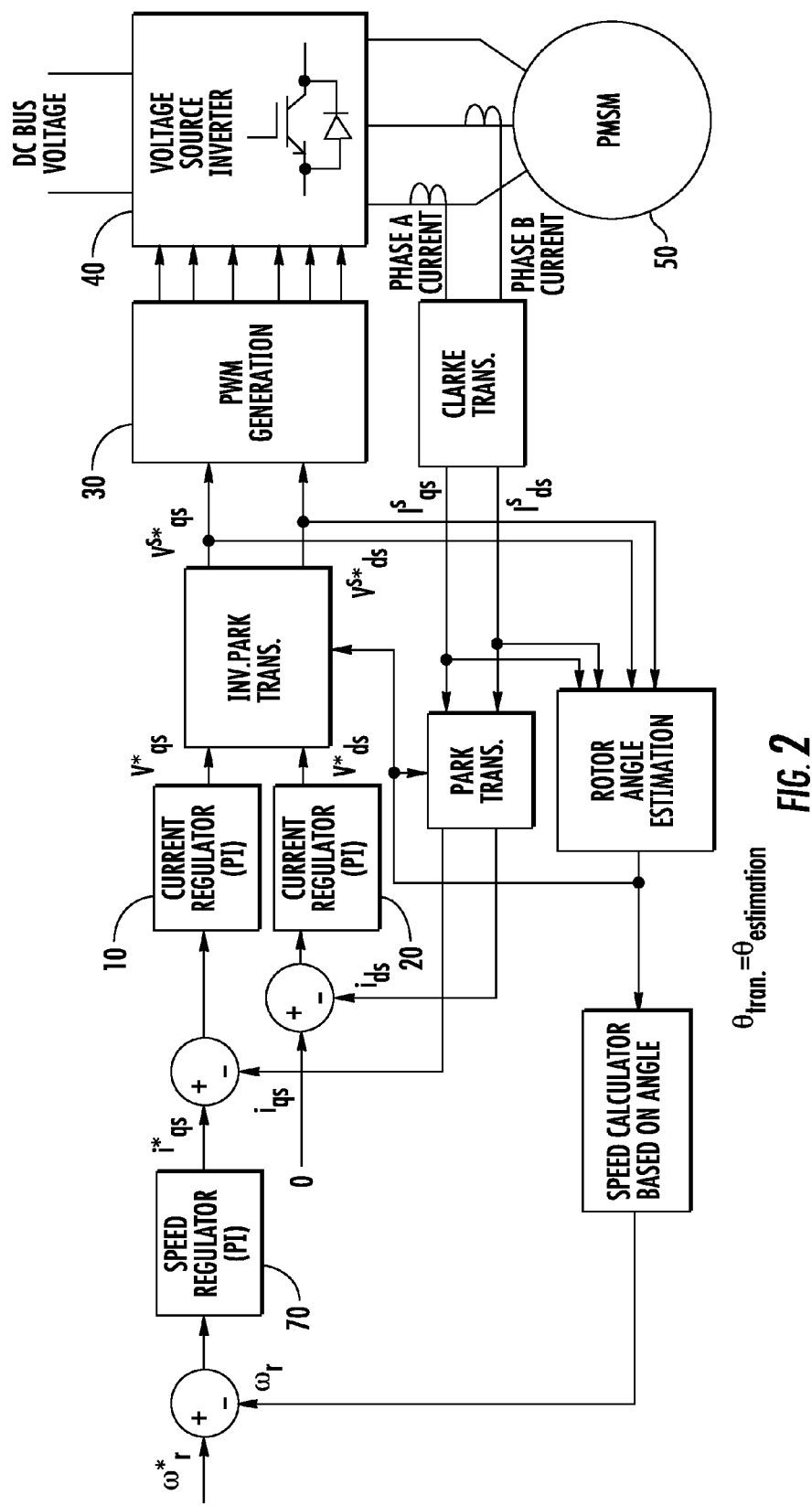
FIG. 2 is a schematic illustration of sensorless vector closed loop control scheme.

A novel method to start a permanent magnet synchronous motor (PMSM) for compressor applications is proposed. Using the proposed method, an embodiment permits starting under loaded conditions. As such, the compressor does not need to release its pressure in an otherwise waste of energy. The proposed method provides a smooth transition between an open loop control scheme as illustrated in FIG. 1 and a sensorless vector closed loop control scheme as illustrated in FIG. 2. Thus, transient performance could be significantly improved with reduced peak current and oscillations leading to both system stability and extended lifetime of the compressor and drive. Also, the proposed method allows for fast starts and restarts of compressors. Although the description provided herein relates to PMSMs operably coupled to compressors, it is understood that the present invention may be applied to various applications of a PMSM and to other types of motors as well. Such other types of motors may include, for example, brushless DC (BLDC) motors and electronically communicated motors (ECMs).

With reference to FIG. 1, an open loop ramp start control scheme for controlling a compressor at startup includes a first current regulator 10 and a second current regulator 20. An initial torque current error command is applied to the first current regulator 10 and reflects a difference between a reference torque current and a feedback torque current. Similarly, an initial flux current error command is applied to the second current regulator 20 and reflects a difference between a reference flux current and a feedback flux current. The first and second current regulators 10 and 20 may include proportional integral controllers and are configured to produce output command signals based on the initial torque current error command and the initial flux current error command, respectively. The command signals output from the first and second current regulators 10 and 20 are input via an Inverse Park transformation to a pulse width modulation (PWM) signal generator 30, which then produces a PWM signal that is input to a voltage source inverter 40. The voltage source inverter 40 employs the PWM signal to generate a control signal from a DC bus voltage, which is input to a PMSM 50 to drive an operation of the PMSM 50.

Current information (i.e., Phase A current and Phase B current) is used as the control signal and employed in a feedback loop 60 by way of, e.g., Clarke and Park transformations 601, 602 to generate the torque and flux current feedback. This torque and flux current feedback is then provided to the first and second current regulators 10 and 20, respectively. As described herein, the Park transformation and the Inverse Park transformation each rely upon an input of a ramping angle, $\theta_{ramping}$, which is derived from a speed reference desired for the operation of the PMSM 50, as shown in FIG. 1. That is, since the open loop control scheme of FIG. 1 does not include a measure of the rotational speed or angle of the rotor of the PMSM 50, a commanded rotational speed or angle in accordance with the speed reference must be provided instead and at least until a closed loop control scheme can be initiated safely.

With reference to FIG. 2, a sensorless vector closed loop control scheme includes similar features as the control scheme of FIG. 1 except that, in this case, the rotor has already begun to rotate and the control scheme further includes as an input to the first and second current regulators 10 and 20 a measure of the actual rotational speed and angle of the rotor. The measure of the actual rotational speed and angle of the rotor is actually an estimation of the rotational speed and angle of the rotor, $\theta_{estimation}$, which is based on the control signal generated by the inverter 40 since a direct measurement is normally difficult if not impossible. This estimation increases in accuracy as the magnitude of the feedback current increases. Thus, as the rotational speed of the rotor of the PMSM 50 increases and the magnitude of the feedback current correspondingly increases, the value of $\theta_{estimation}$, which becomes a relatively accurate measure of the rotational speed and angle of the rotor of the PMSM 50 and is passed to the speed regulator 70 and to the first and second current regulators 10, 20.

Figure 3:
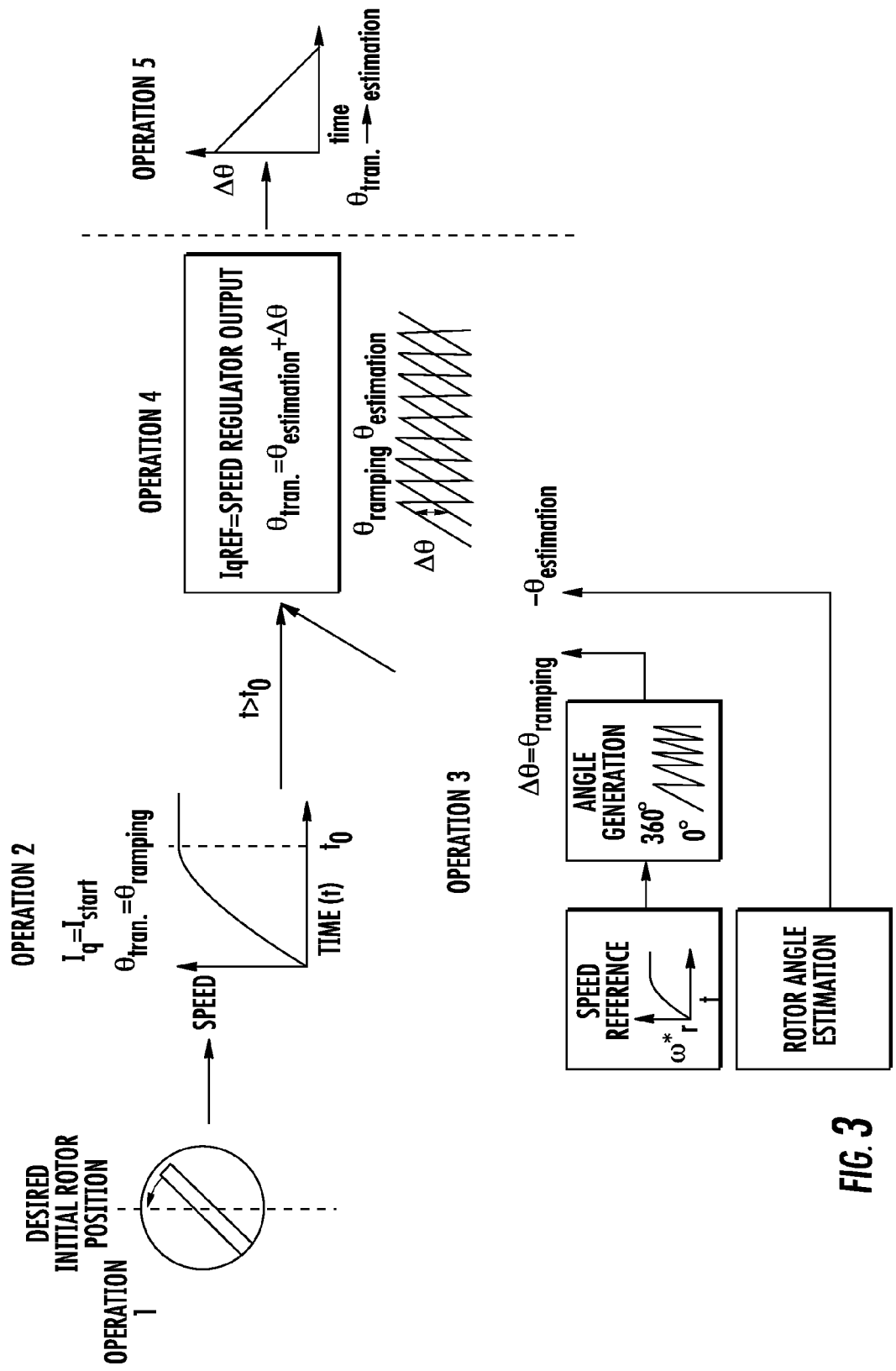
FIG. 3 is a schematic illustration of transition procedures from the open loop control scheme of FIG. 1 to the sensorless vector closed loop control scheme of FIG. 2 according to embodiments.

There is frequently if not always an angle difference, $\Delta\theta$, between the ramping angle, $\theta_{ramping}$, of the open loop control scheme of FIG. 1, and the estimation angle, $\theta_{estimation}$, of the closed loop control scheme of FIG. 2. The transition procedures of FIG. 3 account for this angle difference, $\Delta\theta$, and thereby permit a smooth transition between the respective control schemes of FIGS. 1 and 2. With reference to FIG. 3, an initial rotor position alignment is set to a known starting position (operation 1) and the motor is started using the open loop vector control scheme of FIG. 1 (operation 2) whereby the Park and Inverse Park transformations rely upon the ramping angle, $\theta_{ramping}$, generated from the speed reference. Operation 2 continues while following a startup speed reference curve to the target speed, as shown in FIGS. 1 and 3. The magnitude of the start current is decided by the initial load condition. Higher loads will require higher start current.

In operation 3, the angle difference between the estimated (or actual) rotor angle, $\theta_{estimation}$, and the ramping angle, $\theta_{ramping}$, is calculated as $\Delta\theta$ during and after ramping is completed. Ramping completion is determined on a case by case basis and is application specific in that ramping can be completed slowly or quickly in accordance with a desired load condition. After the ramping target is reached, in operation 4, the ramping angle, $\theta_{ramping}$, is replaced using the estimated angle plus the angle difference, $\theta_{estimation}+\Delta\theta$, for the Park and Inverse Park transformations and the output of the speed regulator 70 is made the reference signal to the first current regulator 10.

At this point, in operation 5, the angle difference, $\Delta\theta$, is gradually reduced to zero until the two angles, $\theta_{estimation}$ and $\theta_{transition}$, are substantially equal to one another. The transition between the open loop control scheme of FIG. 1 to the closed loop control scheme of FIG. 2 is then finished and the control algorithm employed to control the PMSM 50 becomes the sensorless vector closed loop control scheme, as shown in FIG. 2.

In accordance with embodiments, operations 4 and 5 of FIG. 3 may be implemented in a different manner from what is described above to enable the smooth transition from the open loop ramp start scheme of FIG. 1 to the closed loop sensorless vector control of FIG. 2. In operation 4, the ramping angle for the Park and Inverse Park transformations may be changed from a case where $\theta_{transformation}=\theta_{ramping}$ to a case where $\theta_{transformation}=\theta_{estimation}+k*\Delta\theta$. Here, the constant, k, is initialized to a value of 1 to thereby maintain a continuity of the value of $\theta_{transformation}$ and so that the angle difference, $\Delta\theta$, continues to be equal to a difference between the ramping angle, $\theta_{ramping}$, and the estimation angle, $\theta_{estimation}$, as a function of time. In operation 5, the variable k is ramped down from 1 to zero (and kept at zero) over a predefined time interval that is tunable. When k becomes zero, the transition is completed and the algorithm employed to control the PMSM 50 becomes the sensorless vector closed loop scheme, as shown in FIG. 2.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of conducting smooth motor startup, the method comprising:

operating a motor in an open loop control scheme at startup by applying error commands to current regulators from a feedback loop, which takes current information derived from a control signal output from the current regulators to an Inverse Park transformation and a speed reference-derived ramping angle command to generate the error commands at serially arranged Clark and Park transformations, the speed-derived ramping angle command being received at the Inverse Park and Park transformations;

operating the motor in a closed loop sensorless control scheme at a time after startup by applying the error commands to the current regulators from the feedback loop, which takes current information derived from the control signal output from the current regulators to the Inverse Park transformation and actual rotor speed and angle estimates to generate the error commands at the serially arranged Clark and Park transformations, the actual rotor angle estimate being received at the Inverse Park and Park transformations and the actual rotor speed estimate being received at one of the current regulators; and transitioning between the open loop control scheme and the closed loop control scheme by reducing a difference between an estimated rotor angle of the motor and a commanded ramping angle of the motor.

2. The method according to claim 1, further comprising setting an initial rotor position to a known starting position.

3. The method according to claim 1, wherein the operating in the open loop control scheme follows a startup reference curve to a target speed.

4. The method according to claim 1, further comprising calculating the difference between the estimated rotor angle and the commanded ramping angle.

5. The method according to claim 1, wherein the reducing comprises:

replacing the commanded ramping angle with a sum of the estimated rotor angle and the difference;

connecting an output of a speed regulator as a reference signal to a current regulator; and gradually reducing the difference.

6. The method according to claim 5, wherein the difference is gradually reduced to zero.

7. The method according to claim 1, wherein the reducing comprises:
- replacing the commanded ramping angle with a sum of the estimated rotor angle and the difference times a constant, where the constant is initialized as 1 and the difference is continually computed as a function of time;
- connecting an output of a speed regulator as a reference signal to a current regulator; and
- gradually reducing the constant to zero.

8. A method of operating a permanent magnet synchronous motor (PMSM) compressor for smooth motor startup, the method comprising:
- operating the PMSM in an open loop control scheme at startup by applying error commands to current regulators from a feedback loop, which takes current information derived from a control signal output from the current regulators to an Inverse Park transformation and a speed reference-derived ramping angle command to generate the error commands at serially arranged Clark and Park transformations, the speed-derived ramping angle command being received at the Inverse Park and Park transformations;
- operating the PMSM in a closed loop sensorless control scheme at a time after startup by applying the error commands to the current regulators from the feedback loop, which takes current information derived from the control signal output from the current regulators to the Inverse Park transformation and actual rotor speed and angle estimates to generate the error commands at the serially arranged Clark and Park transformations, the actual rotor angle estimate being received at the Inverse Park and Park transformations and the actual rotor speed estimate being received at one of the current regulators; and
- transitioning between the open loop control scheme and the closed loop control scheme by determining a difference between an estimated rotor angle and a commanded ramping angle and controlling the commanded ramping angle to reduce the difference.

9. The method according to claim 8, further comprising setting an initial rotor position to a known starting position.

10. The method according to claim 8, wherein the operating of the PMSM in the open loop control scheme follows a startup reference curve to a target speed.

11. The method according to claim 8, wherein the determining comprises calculating the difference between the estimated rotor angle and the commanded ramping angle.

12. The method according to claim 8, wherein the controlling of the commanded ramping angle to reduce the difference comprises:
- replacing the commanded ramping angle with a sum of the estimated rotor angle and the difference;
- connecting an output of a speed regulator as a reference signal to a current regulator; and
- gradually reducing the difference.

13. The method according to claim 12, wherein the difference is gradually reduced to zero.

14. The method according to claim 8, wherein the reducing comprises:
- replacing the commanded ramping angle with a sum of the estimated rotor angle and the difference times a constant, where the constant is initialized as 1 and the difference is continually computed as a function of time;
- connecting an output of a speed regulator as a reference signal to a current regulator; and
- gradually reducing the constant to zero.

15. A method of operating a permanent magnet synchronous motor (PMSM) compressor for smooth motor startup, the method comprising:
- operating the PMSM in an open loop control scheme at startup with a predefined load condition by applying error commands to current regulators from a feedback loop, which takes current information derived from a control signal output from the current regulators to an Inverse Park transformation and a speed reference-derived ramping angle command to generate the error commands at serially arranged Clark and Park transformations, the speed-derived ramping angle command being received at the Inverse Park and Park transformations;
- operating the PMSM in a closed loop sensorless control scheme at a time after startup by applying the error commands to the current regulators from the feedback loop, which takes current information derived from the control signal output from the current regulators to the Inverse Park transformation and actual rotor speed and angle estimates to generate the error commands at the serially arranged Clark and Park transformations, the actual rotor angle estimate being received at the Inverse Park and Park transformations and the actual rotor speed estimate being received at one of the current regulators; and
- transitioning between the open loop control scheme and the closed loop control scheme by determining a difference between an estimated rotor angle and a commanded ramping angle and controlling the commanded ramping angle to reduce the difference to zero.

16. The method according to claim 15, further comprising setting an initial rotor position to a known starting position.

17. The method according to claim 15, wherein the operating of the PMSM in the open loop control scheme follows a startup reference curve to a target speed.

18. The method according to claim 15, wherein the determining comprises calculating the difference between the estimated rotor angle and the commanded ramping angle.

19. The method according to claim 15, wherein the controlling of the commanded ramping angle to reduce the difference comprises:
- replacing the commanded ramping angle with a sum of the estimated rotor angle and the difference;
- connecting an output of a speed regulator as a reference signal to a current regulator; and
- gradually reducing the difference.

20. The method according to claim 15, wherein the reducing comprises:
- replacing the commanded ramping angle with a sum of the estimated rotor angle and the difference times a constant, where the constant is initialized as 1 and the difference is continually computed as a function of time;
- connecting an output of a speed regulator as a reference signal to a current regulator; and
- gradually reducing the constant to zero.

* * * * *